(12) United States Patent
Steiner et al.

(10) Patent No.: US 6,518,564 B1
(45) Date of Patent: Feb. 11, 2003

(54) PROCESS AND DEVICE FOR READING RADIATION IMAGE INFORMATION STORED ON AN IMAGE MEDIUM BY DETECTING BOTH THE LUMINESCENT LIGHT EMITTED AND THE REFLECTED READ OUT LIGHT

(75) Inventors: Christof Steiner, Oberfeldstrasse 3A, D-726275 Ettlingen (DE); Rainer Ochs, Wildbad (DE)

(73) Assignee: Christof Steiner (DE)

(*) Notice: Subject to any disclaimer, the term of this patent is extended or adjusted under 35 U.S.C. 154(b) by 0 days.

(21) Appl. No.: 09/601,370

(22) PCT Filed: Dec. 18, 1998

(86) PCT No.: PCT/EP98/08323

§ 371 (c)(1),
(2), (4) Date: Sep. 7, 2000

(87) PCT Pub. No.: WO99/39503

PCT Pub. Date: Aug. 5, 1999

(30) Foreign Application Priority Data

Jan. 30, 1998 (DE) .......................................... 198 03 588

(51) Int. Cl.$^7$ .................................................. H01J 3/14
(52) U.S. Cl. ..................... 250/236; 250/484.4; 250/587
(58) Field of Search ................................. 250/236, 570, 250/484.2, 484.3, 484.4, 584, 585, 586, 587

(56) References Cited

U.S. PATENT DOCUMENTS

| | | | | | |
|---|---|---|---|---|---|
| 4,728,791 A | * | 3/1988 | Goto | ........................... | 250/586 |
| 4,749,861 A | * | 6/1988 | Watanabe | .................... | 250/586 |
| 4,896,222 A | * | 1/1990 | Fukai | ........................... | 250/587 |
| 5,151,596 A | * | 9/1992 | Saotome | ....................... | 250/585 |
| 5,198,669 A | * | 3/1993 | Namiki et al. | ............... | 250/587 |
| 5,550,385 A | * | 8/1996 | Nanami et al. | .............. | 250/584 |
| 5,832,055 A | * | 11/1998 | Dewaele | ..................... | 250/587 |
| 5,841,148 A | * | 11/1998 | Some et al. | ................. | 250/584 |

FOREIGN PATENT DOCUMENTS

| | | | |
|---|---|---|---|
| EP | 0098574 | * | 1/1984 |
| EP | 0594070 | * | 4/1994 |
| EP | 0658778 | * | 6/1995 |

* cited by examiner

Primary Examiner—Stephone B. Allen
Assistant Examiner—Bradford Hill
(74) Attorney, Agent, or Firm—Pendorf & Cutliff

(57) ABSTRACT

The invention relates to a method and a device for reading out radiation image information stored on an image medium (12). A scanning unit (10) has a laser (16) for scanning the image medium (12) with a readout light beam (22). The read/processing device (14) functions with two channels so that the luminescent light emitted by the image medium (12) during scanning and also the reflected read-out light are synchronously detected, evaluated and correlated. The digital luminescent light image values are corrected according to the digital reflection light values in order to better obtain the radiation image information.

11 Claims, 3 Drawing Sheets

PROCESS AND DEVICE FOR READING RADIATION IMAGE INFORMATION STORED ON AN IMAGE MEDIUM BY DETECTING BOTH THE LUMINESCENT LIGHT EMITTED AND THE REFLECTED READ OUT LIGHT

CROSS REFERENCE TO RELATED APPLICATION

This application is a national stage of PCT/EP98/08323 filed Dec. 18, 1998 and based upon DE 198 03 588.8 filed Jan. 30, 1998 under the International Convention.

BACKGROUND OF THE INVENTION

1. Field of the Invention

The invention concerns a process and a device for readout radiation image information stored on an image medium, in particular a phosphorus storage plate coated with a crystalline storage substance, imaged by exposure to high energy radiation.

2. Description of the Related Art

In known devices of this type an image medium for receiving a radiation image is radiated for example in an electron microscope, and is then optically read in a separate readout device by scanning under luminescence-excitation. The utilized image medium have a high dynamic, however the image quality is compromised by inhomogeneities in the image layer. One problem is comprised therein, that images of different scans have a displacement or offset with respect to each other as a rule on the basis of differing orientations of the image medium in the reading device. A further problem is comprised in the unambiguous identification of the individual employed image plates.

SUMMARY OF THE INVENTION

Beginning therewith, it is the task of the invention to improve a process and a device of this type, such that the radiation image information can be read out reliably and with low affliction of errors. A high quality should also be guaranteed, especially in the case of high radiation intensities wherein static noise artifacts occur in the background as opposed to systematic errors on the basis of image medium inhomogeneities.

The invention is based on the discovery, that the light reflected from the image medium can be correlated with the luminescence light and therewith can be used complimentary or supplementary for evaluating the radiation image information. In accordance therewith, it is envisioned for the process aspect of the solution of the above-mentioned task, that during scanning of the image plate, the reflectioned readout light is continuously monitored as a reflection signal, and the reflection signal is converted into digital reflection values in synchrony with the image signal. Therewith, the detected values can be clearly associated and be evaluated with respect to correlation. Generally, from the processing of the reflection light, there results an information gain, which in the end makes possible a substantial increase in the range of employment of the image media.

A particularly advantageous aspect is comprised therein, that the image values for obtaining the radiation image information allow themselves to be corrected in accordance with the magnitude of the reflection value. This can generally occur by determining from the reflection value the correction value to be associated with the image points, and that the image value is scaled or graduated image-point-wise with the correction value.

It is further of particular advantage, when a reference image is produced by a homogenous surface radiation of the image medium. Therewith it is above all possible to clearly determine correlations between the parallel determined image- and reflection value by a one-time measurement, and to utilize this for correction or as the case may be processing of various non-homogenous working images. Advantageously correlation data $(a_k, K)$ are thereby determined from the image values $B_R(z,\phi)$ and reflection values $R_R(z,\phi)$ of the reference image, and the image values $B(z,\phi)$ of a working image are corrected according to the values from the stored correlation data $(a_k, K)$ associated reflection values $R(z,\phi)$.

It is particularly advantageous when the correlation data from the image and reflection values of the reference image are determined in the Fourier area. For this the variance of the values $$B'_R(z,\phi)=B_R(z,\phi)\cdot[a_k\cdot F_2^{-1}\{F_2\{R_R(z,\phi)\}\cdot K(u,v)\}]^{-1}$$

are minimized, wherein $B'_R$ refers to the corrected image value of the reference image, $a_k$ refers to a correlation factor to be varied, $K(u,v)$ corresponds to varying correlation coefficients in the Fourier area, $F_2$ corresponds to a two-dimensional Fourier transformation and $F_2^{-1}$ corresponds to the inverse transformation. With the correlations determined in this manner the image values $B(z,\phi)$ can be corrected from the working images in accordance with the equation or relationship $$B'(z,\phi)=B(z,\phi)\cdot[a_k\cdot F_2^{-1}\{F_2\{R_R(z,\phi)\}\cdot K(u,v)\}]^{-1}$$

wherein $B'(z,\phi)$ corresponds to the corrected image value of the working image, $a_k$ and $K(u,v)$ corresponds to the determined and the stored correlation data, $F_2$ corresponds to the two dimensional Fourier transformation and $F2^{-1}$ refers to the inverse transformation.

A further advantageous aspect of the reflection signal evaluation is comprised therein, that a working and a reference image can be correlated to each other with respect to common scanning coordinates. Therewith the various possible fixing positions of the image medium in the read-out device can be mathematically taken into account, so that an image correction on the basis of previously determined data with respect to given image point coordinates is possible. For this it is advantageous, by cross-correlation of the reflection values R, $R_R$ of a working and a reference image, to determine the translation vector $\vec{r}$ and rotation angle $\alpha$ of a one-to-the-other associated image points of the working and the reference image mapped coordinate transformation.

A doubled correction with respect to the errors from inhomogeneities is made possible thereby, that from the image values B, $B_R$ of a working and a reference image according to the measurement of the associated reflection values R,$R_R$ corrected image values B',$B'_R$ are produced, the corrected image values B',$B'_R$ to are rectified each other, and the rectified or aligned corrected image values B" of the working image are scaled or graded with the rectified or aligned corrected image values B"$_R$ of the reference image.

A further advantageous aspect of the reflection light determination is comprised therein, that by comparison of the reflection values R of a working image with stored reflection values $R_R$ of reference images of varying image mediums the particular image medium employed for recording the working image can be identified on the basis of positionally correlated inhomogeneities of the storage layer.

In respect to a device, it is proposed to solve the inventive task by providing in the reading/processing device a second photo-detector for sensing the readout light reflected by the image medium during scanning, and a second analog/digital converter for converting this starting signal into a digital reflection value $R(z,\phi)$. The two channel determination makes possible an evaluation of the correlation between the luminescence and the reflection light signal. In order to clearly associate the digitized value of the two channels to each other, a clock pulse generator is provided for synchronized controlling of the two analog/digital converters. Therewith one working and one reflection value can be produced at the same time at each clock pulse signal and via the instantaneous scanning coordinates an image point can be fixed.

BRIEF DESCRIPTION OF THE DRAWINGS

In the following the invention will be described in greater detail on the basis of the embodiment shown in schematic manner in the figures. There is shown in FIG. 1 a device for reading radiation image information stored on an image medium plate.

DETAILED DESCRIPTION OF THE INVENTION

Figure 1:
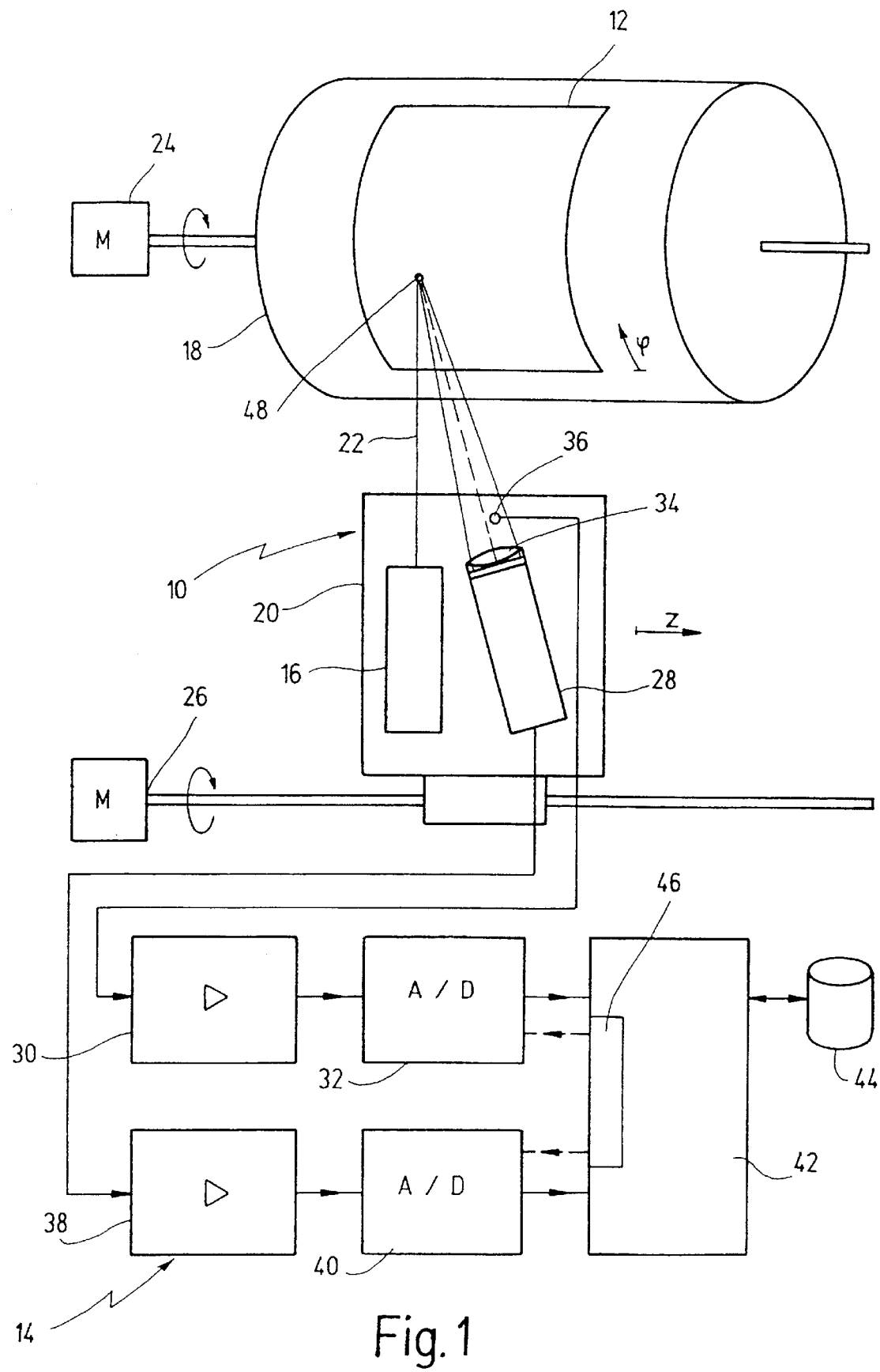

The device shown in FIG. 1 is comprised essentially of a scanning unit 10 for optical scanning of an image or, as the case may be, a phosphorus storage plate 12 and a reading/processing device 14 for reading and processing the radiation image information stored in the image medium 12 by previous radiation exposure, for example by means of an X-ray device or an electron microscope, and recalled again by light radiation.

The scanning unit 10 includes a readout light source in the form of a laser 16, and scan device 18,20 for producing relative movement between the readout light beam 22 produced by the laser 16 and the image medium 12, so that the upper surface formed by a crystalline storage layer is point-by-point painted over by the incident readout light beam 22. For this the scanning device 18, 20 includes a rotatable scanner shaft adapted for receiving the image medium 12 on the outer casing in positionally defined manner and rotatable by means of motor 24 about its central axis, and a scanner head 20 carrying the laser 16 aimed against the jacket surface and moveable via spindle drive 26 in the axial direction of the scanning shaft. The instantaneous scanned position of the read out light beam 22 is a product of the rotation position $\phi$ of the scanner shaft and the displacement position z of the spindle drive 26 in a cylinder coordinate system, and can be determined by a not-shown controller for the motors 24, 26.

The readout light beam 22 stimulates on the image medium 12 the emission of luminescence light, of which the intensity depends upon the stored radiation image information. For readout the luminescence light the scanner/processor device 14 includes a first signal channel, which is formed by a first photo-detector constructed as a photo-multiplier 28, a first signal amplifier 30 connected on the input side with the image signal providing photo-multiplier 28, and a first analog-digital converter 32 acted on by the output signal of the signal amplifier 30. An optical filter 34 ensures that only the luminescence light is transmitted in the entry cross-section of the photo-multiplier 28.

In order to detect the reflected portion of the read out light during scanning of the image medium 12, the scanning/processing device 14 includes a second signal channel, which is comprised of a photo-detector 36 constructed for example as a photodiode, a second signal amplifier 38 connected on the input side with the reflection signal delivering second photo-detector 36, and a second analog/digital converter 40 acted on by the output signal of the second signal amplifier 38.

For processing the digital data the scanning/processing device 14 includes an image computer 42, which is connected to a storage means 44. Further, the image computer 42 is coupled to a clock pulse generator 46, which synchronously hits on the two analog/digital converters 32, 40 with clock time pulses depending upon the scan coordinates. At each clock time impulse the luminescence image signals are converted by the first analog-digital converter 32 into digital image values B and the reflection signals are converted via the second analog-digital converter 40 into digital reflection values R and assigned in the image computer 42 the image point 48 on the image medium 12 defining momentary scan coordinate $z,\phi$. As a consequence of the luminescence emission the information stored on the image medium 12 is "erased", so that the image plate 12 is ready to be used again for new exposure to a radiation image.

For correction of the systematic image errors, which are caused by inhomogeneities in the image layer of the image medium 12, the radiation image information can be processed in the image computer 42. Therein use is made of the discovery, that the intensity of the reflected readout light depends upon how far the readout light beam can penetrate into the image plate 12 and excite a luminescence center to emission. Therein positive or negative correlations in the signal strength of the image and reflection signal can occur respectively depending on the outer surface of the image plate 12 and the internal medium characteristics. These correlations allow themselves to be used in order to correct the image value $B(z,\phi)$ according to the measure of the reflection value $R(z,\phi)$ using the computer. Generally the image point associated correction values $C(z,\phi)$ are determined therein in dependence upon the reflection value $R(z,\phi)$, with which the image values $B(z,\phi)$ allow themselves to be scaled image-point-wise according to the equation $$B'(z,\phi)=B(z,\phi)\cdot[a_k\cdot C(z,\phi)]^{-1} \tag{1}$$

wherein $B'(z,\phi)$ corresponds to the corrected image value and $a_k$ corresponds to a correlation factor.

The above described correlations preferably allow themselves to be determined thereby, that a reference image is produced by surface homogenous radiation of the image plate. Inhomogeneities of the image plate 12 can then be detected by corresponding deviations of the image and reflection value. This can be employed for cleansing various recorded working images with respect to the systematic errors caused by inhomogeneities. Generally this can be achieved thereby, that first from the image values $B_R(z,\phi)$ and reflection values $R_R(z,\phi)$ of the reference image correlation data $(A_k,K)$ are determined. These reflection values $R_R(z,\phi)$ of a working image can then be associated with the correlation data, in order to subsequently correct the image values $B(z,\phi)$ of the working image according to the value of the correlated reflection value.

For determination of the correlation data, in place of the evaluations of space-position correlations, the fourier components of the image and reflection signal can be drawn upon and in certain cases be subjected to a frequency correction. This can advantageously be accomplished by a program routine in an image calculator 42 for example with calculation of the smallest error square with which the variance of the values $$B'_R(z, \phi) = B_R(z,\phi) \cdot [a_k \cdot F_2^{-1}\{F_2\{R_R(z,\phi)\} \cdot K(u,v)\}]^{-1} \quad (2)$$

is minimized, wherein $B'_R$ corresponds to corrected image values of the reference image, $a_k$ corresponds to a correlation factor to be varied, $K(u,v)$ corresponds to a correlation co-efficient to be varied in the fourier area $(u,v)$, $F_2$ corresponds to a two dimensional fourier transform and $F_2^{-1}$ corresponds to an inverse transformation. With the correlation data obtained according to equation (2) and fixedly associated with image medium 12 there can then according to equation (1) the image values $B(z,\phi)$ of working images be corrected using the equation $$B'(z,\phi) = B(z,\phi) \cdot [a_k \cdot F_2^{-1}\{F_2\{R_R(z,\phi)\} \cdot K(u,v)\}]^{-1} \quad (3)$$

Figure 2A:
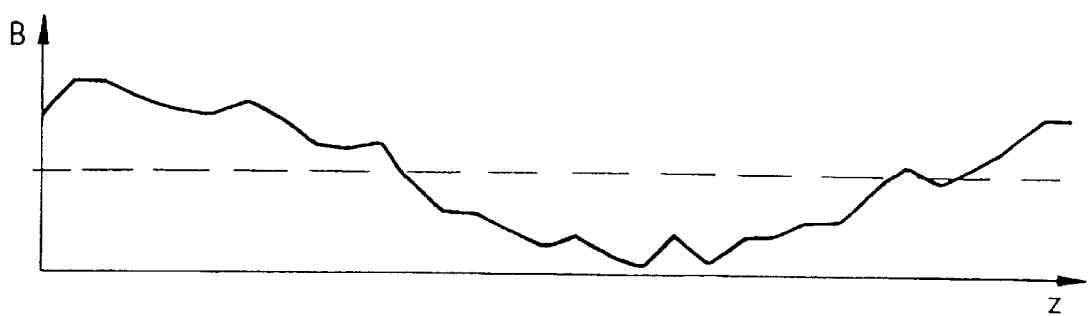
FIGS. 2a through 2c diagrams showing the correction of a radiation image.
Figure 2B:
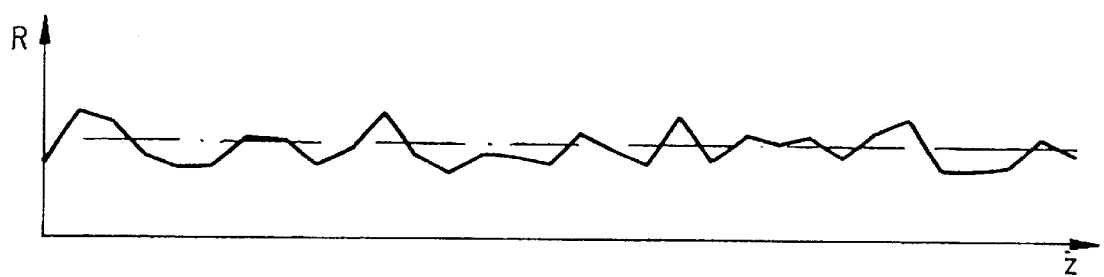
Figure 2C:
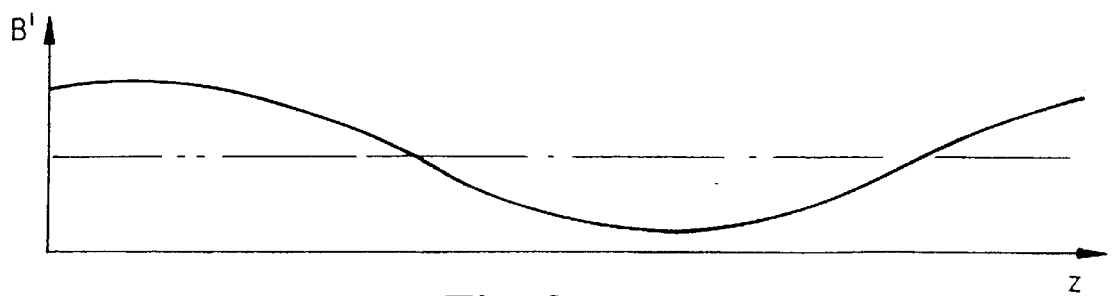
Figure 3A:
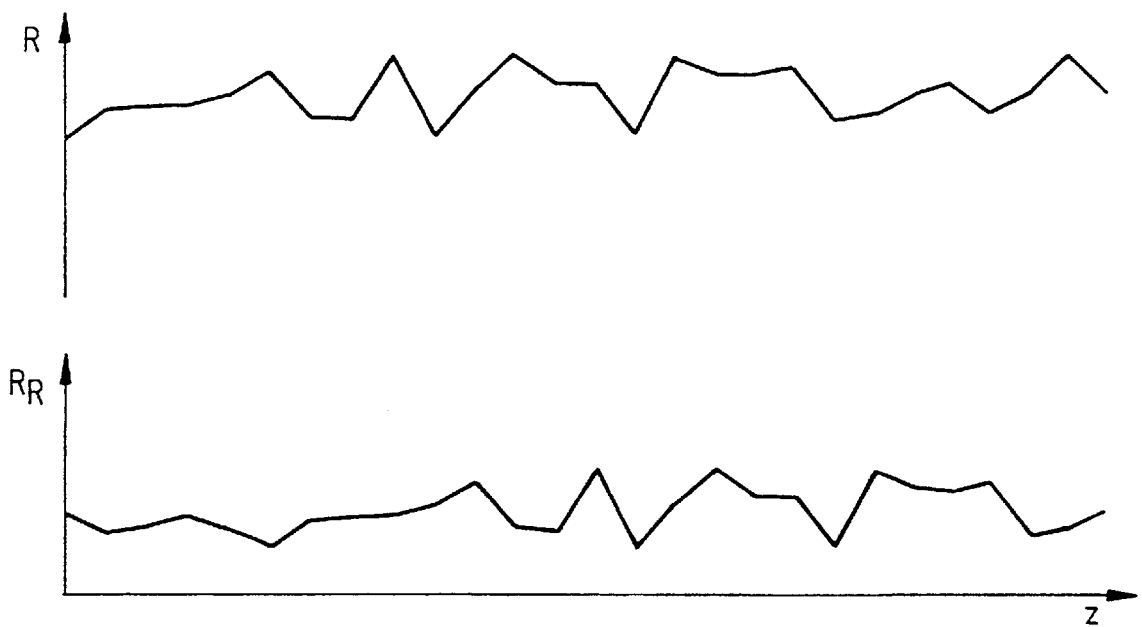
FIGS. 3a and 3b a diagrams for illustrating the rectification (alignment) of a radiation image.
Figure 3B:
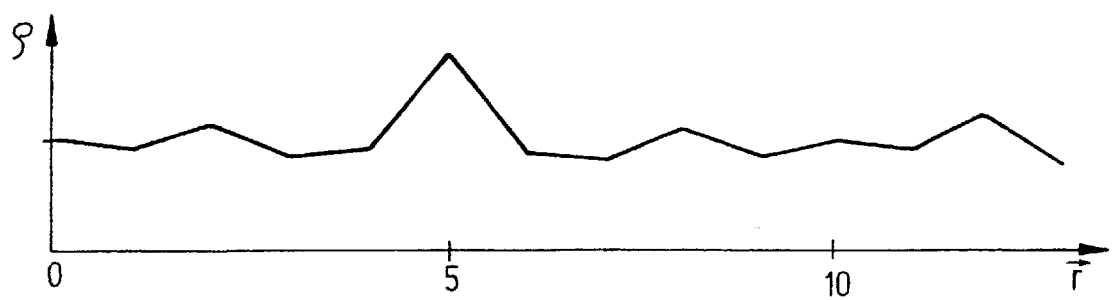

In FIG. 2 there is shown the result of the correction process according to equation (3) for a line shaped scanned number of discrete individual data represented as a continuous line. By evaluation of the reflection values it is further possible to correlate the working and reference images with respect to common scan coordinates to each other, whereby deviating orientations of the image medium 12 on the scan shaft 18 in the case of varying scans allow themselves to be computer compensated. For this, using the already known calculations for cross-correlation of the reflection value of a working and reference image, the translation vector $\vec{r}$ and rotation angle $\alpha$ of a coordinate transformation can be determined, which images or maps the associated correlated image points of the working and reference image to each other. From FIG. 3*b* this proceeds for a number of line shaped scanned reflection values R of a work image and $R_R$ of a reference image (FIG. 3*a*), under the presumption that the correlation co-efficient $\rho$ exhibits a maximum at $\vec{r} = 5$, corresponding to an image displacement in the z-direction of five image points.

The two channel determination of luminescence and reflection light can thus be used in order in a doubled image correction first from the image values $B, B_R$ of a working and reference image according to equation (1) or as the case may be (3) to produce a corrected image value $B', B'_R$, and then to align or rectify the corrected image values $B', B'_R$ to each other, and finally to scale or graduate the aligned or rectified corrected image values $B''$ of the work image with the rectified corrected image value $B''_R$ of the reference image according to the equation $$B''' = \frac{B''}{m \cdot B''_R} \quad (5)$$

wherein m is a constant factor.

Finally it is also possible by comparison of the reflection value R of a working image with stored reflection values $R_R$ of reference images of varying image plates to identify the particular image plate used for the taking of the working image.

In summary the following is to be concluded: The invention relates to a method and a device for readout radiation image information stored on an image medium 12. A scanning unit 10 has a laser 16 for scanning the image medium 12 with a readout light beam 22. The read/processing device 14 functions with two channels so that the luminescent light emitted by the image medium 12 during scanning and also the reflected read-out light are synchronously detected, evaluated an correlated. The digital luminescent light image values are corrected according to the digital reflection light values in order to better obtain the radiation image information.

What is claimed is:

1. A process for reading radiation image information stored on an image medium (12), wherein the radiation image information is formed by high-energy radiation of a phosphorus storage plate coated with a crystalline storage substance, the process including the steps of:

scanning the image medium with a readout light beam, wherein the readout light beam comprises a laser beam;

continuously detecting an emitted luminescence light as an image signal;

determining an image-point defined by scanning coordinates $(z,\phi)$ converting the image signal into a radiation image information containing digital image values $B(z,\phi)$, continuously detecting a readout light reflected during the scanning of the image medium as a reflection signal;

converting the reflection signal in synchrony with the image signal into digital reflection values $R(z,\phi)$;

determining from the reflection value $R(z,\phi)$ a correction value $C(z,\phi)$ to be associated with the image-point; and scaling the image values image-point wise with the correction values.

2. Process according to claim 1, further comprising producing a reference image by surface homogenous radiation of an image medium (12), and separately processing images taken on the image medium (12) after or before the reference image by at least one of means of the stored reflection values $R_R(z,\phi)$ and image values $B_R(z,\phi)$ of the reference image or data derived therefrom.

3. Process according to claim 2, further comprising:

determining correlation data $(a_k, K)$ from the image values $B_R(z,\phi)$ and reflection values $R_R(z,\phi)$ of the reference image, and correcting the image values $B(z,\phi)$ of a work image according to the magnitude of the stored reference values $R(z,\phi)$.

4. Process according to claim 2, wherein during evaluation of the reflection values $R, R_R$ a work and a reference image are aligned or rectified with respect to each other with reference to common scan coordinates.

5. Process according to claim 4, further comprising producing corrected image values $B', B'_R$ from the image values $B, B_R$ of a work and a reference image, in accordance with the magnitude of the associated reflection value $R, R_R$, wherein the corrected image values $B', B'_R$ are aligned or rectified to each other, and wherein an aligned or rectified corrected image values $B''$ of the work image is scaled with an aligned or rectified corrected image values $B''_R$ of the reference image.

6. Process according to claim 2, wherein via the cross-correlation of the reflection values $R, R_R$ of a work and a reference image, the translation vector $\vec{r}$ and rotation angle $\alpha$ of a coordinate transformation is determined mapping the corresponding associated image points of the work and reference images to each other.

7. A process for reading radiation image information stored on an image medium, wherein the radiation image information is formed by high-energy radiation of a phosphorus storage plate coated with a crystalline storage substance, the process including the steps of:

scanning the image medium with a readout light beam, wherein the readout light beam comprises a laser beam;

continuously detecting an emitted luminescence light as an image signal;

determining an image-point defined by scanning coordinates $(z,\phi)$;

converting the image signal into a radiation image information containing digital image values $B(z,\phi)$, continuously detecting a readout light reflected during the scanning of the image medium as a reflection signal;

converting the reflection signal in synchrony with the image signal into digital reflection values $R(z,\phi)$;

determining from the reflection value $R(z,\phi)$ a correction value $C(z,\phi)$ to be associated with the image-point;

scaling the image values image-point wise with the correction values;

producing a reference image by surface homogenous radiation of an image medium (12); and separately processing images taken on the image medium after or before the reference image by at least one of means of the stored reflection values $R_R(z,\phi)$ or image values $B_R(z,\phi)$ of the reference image or data derived therefrom;

wherein for determining the correlation data $(a_k, K)$ from the image and reflection values the variance of the values $$B'_R(z,\phi) = B_R(z,\phi) \cdot [a_k \cdot F_2^{-1}\{F_2\{R_R(z,\phi)\} \cdot K(u,v)\}]^{-1}$$

is minimized, wherein $B'_R$ corresponds to corrected image values of the reference image, $a_k$ corresponds to a correlation factor to be varied, $K(u,v)$ corresponds to a correlation co-efficient to be varied in the Fourier area $(u,v)$, $F_2$ corresponds to a two dimensional Fourier transform and $F_2^{-1}$ corresponds to an inverse transformation.

8. A process for reading radiation image information stored on an image medium, wherein the radiation image information is formed by high-energy radiation of a phosphorus storage plate coated with a crystalline storage substance, the process including the steps of:

scanning the image medium with a readout light beam, wherein the readout light beam comprises a laser beam;

continuously detecting an emitted luminescence light as an image signal;

determining an image-point defined by scanning coordinates $(z,\phi)$;

converting the image signal into a radiation image information containing digital image values $B(z,\phi)$, continuously detecting a readout light reflected during the scanning of the image medium as a reflection signal;

converting the reflection signal in synchrony with the image signal into digital reflection values $R(z,\phi)$;

determining from the reflection value $R(z,\phi)$ a correction value $R(z,\phi)$ to be associated with the image-point; and scaling the image values image-point-wise with the correction values;

producing a reference image by surface homogenous radiation of an image medium (12); and separately processing images taken on the image medium after or before the reference image by at least one of means of the stored reflection values $R_R(z,\phi)$ or image values $B_R(z,\phi)$ of the reference image or data derived therefrom;

wherein by comparison of the reflection values R of a work image with stored reflection values $R_R$ of reference images of various individual image substrates the specific image substrate (12) used for production of the work image is identified.

9. A device for reading radiation image information stored on an image medium, wherein the radiation image information is formed by the high energy irradiation of a phosphorus storage plate coated with a crystalline storage substance, the device comprising:

a) a scanner unit for scanning an image, wherein the scanner comprises a laser for scanning the image medium by means of a readout light beam and a scan device;

b) a reading/processing device for reading and processing the radiation image information stored in the image medium, the reading/processing device having:

a first photo-detector for detecting as an analog image signal the luminescence light emitted during the scanning of the image medium;

a first analog-digital converter for conversion of the image signal into radiation image information containing digital image values $B(z,\phi)$;

a second photo-detector for detecting the readout light reflected during the scanning of the image plate during scaning;

a second analog-digital converter for converting this output signal into digital reflection values $R(z,\phi)$;

c) an image computer to determine an image-point associated correction value $C(z,\phi)$ from the reflection values $R(z,\phi)$, and which scales image values $B(z,®)$ image-point-wise with the correction values.

10. Device according to claim 9, wherein the scanner/processor device (14) includes a clock pulse generator (46) for synchronizing the control of the first and second analog-digital converters (32,40).

11. A process for reading radiation image information stored on an image medium, wherein the radiation image information is formed by high-energy radiation of a phosphorus storage plate coated with a crystalline storage substance, the process including the steps of:

scanning the image medium with a readout light beam, wherein the readout light beam comprises a laser beam;

continuously detecting an emitted luminescence light as an image signal;

determining an image-point defined by scanning coordinates $(z,\phi)$;

converting the image signal into a radiation image information containing digital image values $B(z,\phi)$, continuously detecting a readout light reflected during the scanning of the image medium as a reflection signal;

converting the reflection signal in synchrony with the image signal into digital reflection values $R(z,\phi)$;

determining from the reflection value $R(z,\phi)$ a correction value $C(z,\phi)$ to be associated with the image-point; and scaling the image values image-point-wise with the correction values;

producing a reference image by surface homogenous radiation of an image medium;

separately processing images taken on the image medium after or before the reference image by at least one of means of the stored reflection values $R_R(z,\phi)$ or image values $B_R(z,\phi)$ of the reference image or data derived therefrom; and determining correlation data $(a_k, K)$ from the image values $B_R(z,\phi)$ and reflection values $R_R(z,\phi)$ of the reference image, and correcting the image values $B(z,\phi)$ of a work image according to the magnitude of the stored reference values $R(z,\phi)$;

wherein the image values $B(z,\phi)$ of work images are corrected according to the formula $$B'(z,\phi)=B(z,\phi)\cdot[a_k\cdot F_2^{-1}\{F_2\{R_R(z,\phi)\}\cdot K(u,v)\}]^{-1}$$

wherein $B'(z,\phi)$ corresponds to the corrected image value of the work image, $a_k$ and $K(u,v)$ corresponds to the determined correlation data, $F_2$ corresponds to the two dimensional Fourier transform and $F_2^{-1}$ corresponds to an inverse transformation.

* * * * *